US007495051B2

(12) United States Patent
Nelson et al.

(10) Patent No.: US 7,495,051 B2
(45) Date of Patent: Feb. 24, 2009

(54) NANOCOMPOSITE AND METHOD OF MAKING THE SAME

(75) Inventors: James M. Nelson, Roseville, MN (US); Ryan E. Marx, Cottage Grove, MN (US); John W. Longabach, Woodbury, MN (US); Kenneth J. Hanley, Eagan, MN (US); Mark E. Napierala, St. Paul, MN (US); Terri A. Shefelbine, St. Paul, MN (US); Myles L. Brostrom, West Lakeland Township, MN (US); Jeffrey J. Cernohous, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 516 days.

(21) Appl. No.: 10/950,932

(22) Filed: Sep. 27, 2004

(65) Prior Publication Data

US 2006/0074168 A1 Apr. 6, 2006

(51) Int. Cl.
C08J 9/00 (2006.01)
C08J 9/35 (2006.01)

(52) U.S. Cl. ........................ 524/445; 524/186; 524/447; 501/145

(58) Field of Classification Search ................ 524/445, 524/186, 447
See application file for complete search history.

(56) References Cited

U.S. PATENT DOCUMENTS

| | | | |
|---|---|---|---|
| 3,252,757 A | 5/1966 | Granquist | |
| 3,666,407 A | 5/1972 | Orlemann | |
| 3,671,190 A | 6/1972 | Neumann | |
| 3,844,978 A | 10/1974 | Hickson | |
| 3,844,979 A | 10/1974 | Hickson | |
| 3,852,405 A | 12/1974 | Granquist | |
| 3,855,147 A | 12/1974 | Granquist | |
| 4,469,639 A | 9/1984 | Thompson, III et al. | |
| 5,206,284 A | 4/1993 | Fukui et al. | |
| 5,244,970 A | 9/1993 | Kobayashi et al. | |
| 5,514,734 A | 5/1996 | Maxfield et al. | |
| 5,910,523 A * | 6/1999 | Hudson | 523/213 |
| 5,939,184 A | 8/1999 | Inoue et al. | |
| 6,036,765 A | 3/2000 | Farrow et al. | |
| 6,060,549 A | 5/2000 | Li et al. | |
| 6,339,121 B1 | 1/2002 | Rafailovich et al. | |
| 6,379,791 B1 | 4/2002 | Cernohous et al. | |
| 6,391,326 B1 | 5/2002 | Crepeau et al. | |
| 6,395,386 B2 | 5/2002 | Bagrodia et al. | |
| 6,407,169 B1 | 6/2002 | Gauthier et al. | |
| 6,448,353 B1 | 9/2002 | Nelson et al. | |
| 6,462,122 B1 * | 10/2002 | Qian et al. | 524/445 |
| 6,521,678 B1 | 2/2003 | Chaiko | |
| 6,541,557 B1 | 4/2003 | Hasegawa et al. | |
| 6,579,927 B1 * | 6/2003 | Fischer | 524/445 |
| 6,589,299 B2 | 7/2003 | Missling et al. | |
| 6,630,239 B2 | 10/2003 | Cernohous et al. | |
| 6,716,935 B1 | 4/2004 | Nelson et al. | |
| 6,730,719 B2 | 5/2004 | Powell | |
| 6,767,951 B2 | 7/2004 | Nair et al. | |
| 6,767,952 B2 * | 7/2004 | Dontula et al. | 524/445 |
| 6,777,479 B1 | 8/2004 | Bernard et al. | |
| 2003/0035756 A1 | 2/2003 | Nelson et al. | |
| 2003/0100652 A1 | 5/2003 | Kim et al. | |
| 2004/0023016 A1 | 2/2004 | Cernohous et al. | |
| 2004/0023398 A1 | 2/2004 | Nelson et al. | |
| 2004/0024130 A1 | 2/2004 | Nelson et al. | |
| 2004/0254268 A1 | 12/2004 | Cernohous et al. | |
| 2004/0265188 A1 | 12/2004 | Marx et al. | |

FOREIGN PATENT DOCUMENTS

| | | |
|---|---|---|
| EP | 0 427 344 A2 | 8/1991 |
| JP | 2004-99830 | 4/2004 |
| KR | 2002-0015406 | 2/2002 |
| KR | 2003-0017216 | 3/2002 |
| KR | 2002-0050493 | 6/2002 |
| WO | WO 88/02048 | 3/1988 |
| WO | WO 99/07790 | 2/1999 |
| WO | WO 99/41060 | 8/1999 |
| WO | WO 99/41299 | 8/1999 |
| WO | WO 00/53672 | 9/2000 |
| WO | WO 00/78540 A1 | 12/2000 |
| WO | WO 01/34685 A1 | 5/2001 |
| WO | WO 02/094920 A2 | 11/2002 |
| WO | WO 03/059817 A2 | 7/2003 |
| WO | WO 2004/063260 A2 | 7/2004 |

OTHER PUBLICATIONS

Declaration of Jeffrey J. Cernohous, dated Mar. 11, 2005.
Advincula et al., "Surface Initiated Polymerization (SIP) on Nanoparticle Surfaces: Demonstration of First Principles and Preparation of Nanocomposite Materials", Mat. Res. Soc. Symp. Proc. (2001), vol. 676, pp. Y3.44.1-Y3.44.6.
Chen et al., "Synthesis of Epoxy and Block Oligomer Modified Clay Nanocomposite", Mat. Res. Soc. Symp. Proc. (2002), vol. 703, pp. 547-550.

(Continued)

*Primary Examiner*—Katarzyna Wyrozebski
(74) *Attorney, Agent, or Firm*—Brian E. Szymanski

(57) ABSTRACT

A composition comprising exfoliated silicate platelets; a thermoplastic polymer; and a block copolymer and method of making the same.

22 Claims, No Drawings

OTHER PUBLICATIONS

Lim et al, "Microstructure and Rheological Behavior of Block Copolymer/Clay Nanocomposites", Koren J. Chem. Eng. (2001), vol. 18(1), pp. 21-25.

Lee et al., "Linear Dynamic Viscoelastic Properties of Functionalized Block Copolymer/Organoclay Nanocomposites", Macromolecules (2003), vol. 36, No. 3, pp. 804-815.

Hou et al., "Clay Intercalation of Poly(styrene-ethylene oxide) Block Copolymers Studied by Two-Dimensional Solid-State NMR", Macromolecules (2003), vol. 36, No. 8, pp. 2769-2776.

Limary et al., "Stability of Diblock Copolymer/Layered Silicate Nanocomposite Thin Films", Macromolecules (2000), vol. 33, No. 14, pp. 5227-5234.

Mitchell et al., "Rheological Properties of Diblock Copolymer/Layered Silicate Nanocomposites", Journal of Polymer Science: Part B: Polymer Physics (2002), vol. 40, pp. 1434-1443.

Dortmans et al., "Reinforcement of a Porous PMMA Filter Material by Nanodispersed Clay", Advanced Engineering Materials (2001), vol. 3, No. 9, pp. 717-720.

Moreno et al., "Dielectric relaxation of poly(ethylenglycol)-b-poly(propylenglycol)-b-poly-ethylenglycol) copolymers above the glass transition temperature", Eur. Phys. J. E. (2001), vol. 4, pp. 173-182.

Groenewold et al., "Elastic interactions and stability of clay-filled lamellar phases", Eur. J. Phys. J. E. (2001), vol. 5, pp. 171-182.

Silva et al., "Templating of cylindrical and spherical block copolymer microdomains by layered silicates", Journal of Chemical Physics (Oct. 15, 2001), vol. 115, No. 15, pp. 7166-7174.

Zhang et al., "A novel property of styrene-butadiene-styrene/clay nanocomposites: radiation resistance", Journal of Materials Chemistry, vol. 14, pp. 209-213 (Published on Web Dec. 2, 2003).

Lee et al., "Alignment and orientational proliferation of HEX cylinders in a polystyrene-block-polyisoprene-block-polystyrene copolymer in the presence of clays", Polymer (Mar. 2003), vol. 44, No. 5, pp. 1705-1710.

Chen et al., "Poly(styrene-block-isoprene) Nanocomposites: Kinetics of Intercalation and Effects of Copolymer on Intercalation Behaviors", Journal of Polymer Science: Part B: Polymer Physics (Dec. 15, 2003), vol. 41 No. 24, pp. 3264-3271.

Zhao et al., "Preparation of Poly(styrene-block-butyl-acrylate) Block Copolymer-Silicate Nanocomposites", Chem. Mater. (Jul. 15, 2003), vol. 15, No. 14, pp. 2693-2695.

Wang et al., "Melt-Processable Syndioactic Polystyrene/Montmorillonite Nanocomposites", Journal of Polymer Science: Part B: Polymer Physics (Dec. 15, 2003), vol. 41, No. 24, pp. 3173-3187.

ASTM D-1708-02a "Standard Test Method for Tensile Properties of Plastics By Use of Microtensile Specimens", Annual Book of ASTM Standards (2004), Section 8, vol. 08.01, pp. 394-398.

Runt et al., "Modified Biomedical Poly(Urethane) Block Copolymers: Nanocomposites and Polyisobutylene Comb Polymers", Polymer Preprints (2001), vol. 42, No. 2, pp. 99-100.

Jin et al., "Crystallization Behavior of Polyethylene Glycol Terephthalate/Polyethylene Glycol Intercalated Block Copolymers", Chemical Journal of Chinese Universities (May 2000), vol. 21, No. 5, pp. 801-804 (English Translation Included).

Antipov et al., "Composition and Deformation Behaviour of Nanocomposits on the Base of Low Density Polyethylene and Modified Clays", High-molecular compositions, Series A (2003), vol. 45, No. 11, pp. 1874-1884 (English Translation Included).

Finnefrock et al., "The Plumber's Nightmare: A New Morphology in Block Copolymer—Ceramic Nanocomposites and Mesoporous Aluminosilicates", J. Am. Chem. Soc., (Oct. 29, 2003), vol. 125, No. 43, pp. 13084-13093.

Garcia-Leiner et al., "Melt intercalation in Polymer-Clay nanocomposites promoted by supercritical Carbon Dioxide", Polymeric Materials, Science & Engineering (Sep. 7-11, 2003), vol. 89, pp. 649-650.

Nelson et al., "Method of Making a Composition and Nanocomposites Therefrom", U.S. Appl. No. 10/950,834, filed Sep. 27, 2004.

Nelson et al., "Composition and Method of Making the Same", U.S. Appl. No. 10/950,934, filed Sep. 27, 2004.

* cited by examiner

NANOCOMPOSITE AND METHOD OF MAKING THE SAME

BACKGROUND

Many materials have been added to polymeric resins to reinforce them. Such reinforced polymeric resins are generally referred to as composite materials or "composites". One popular type of such a reinforcing material is fiber. Flake and particulate materials have also been used to reinforce polymer matrices. In particular, a type of composite has emerged in recent years in which the reinforcing material has one or more dimensions on the order of a nanometer. Such a composite is known in the art as a "nanocomposite". One type of nanocomposite has an exfoliated layered silicate as the reinforcing material wherein the layered structure is broken down and individual silicate platelets are dispersed throughout the polymeric resin.

Layered silicates are typically composed of stacked silicate platelets. The silicate platelets typically have a thickness on the order of about one nanometer and typically have an aspect ratio of at least about 100. The spaces between these platelets are called gallery spaces. Under the proper conditions, the gallery spaces can be filled with monomer, oligomer, or polymer. This increases the distance between silicate platelets, swelling the layered silicate in a method termed intercalation. If the layered silicate swells so much that at least some of the individual silicate platelets are no longer organized into stacks, those individual silicate platelets are said to be "exfoliated".

SUMMARY

In one aspect, the present invention provides a method of making a nanocomposite, the method comprising:
combining components comprising:
a layered silicate;
a thermoplastic polymer; and
a block copolymer comprising a block that is compatible with the layered silicate and at least one additional block that is not compatible with the layered silicate; and
exfoliating at least 20 percent by weight of the layered silicate to form a plurality of exfoliated silicate platelets dispersed in the thermoplastic polymer, wherein no additional block contains a segment of 5 consecutive monomeric units that is identical to a segment contained in the thermoplastic polymer, wherein each additional block is immiscible with the thermoplastic polymer, and wherein no additional block forms hydrogen bonds or chemical bonds with the thermoplastic polymer.

Methods according to the present invention broaden the range of processes and materials that may be used to prepare nanocomposites.

Accordingly, in another aspect, the present invention provides a nanocomposite comprising:
exfoliated silicate platelets;
a thermoplastic polymer; and
a block copolymer comprising a block that is compatible with the layered silicate and at least one additional block that is not compatible with the layered silicate, wherein no additional block contains a segment of 5 consecutive monomeric units that is identical to a segment contained in the thermoplastic polymer, wherein each additional block is immiscible with the thermoplastic polymer, wherein no additional block forms hydrogen bonds or chemical bonds with the thermoplastic polymer, and wherein:

the nanocomposite is free of any layered silicate, or the weight ratio of exfoliated silicate platelets to the layered silicate is at least 0.2.

Unless otherwise indicated, d-layer spacing values refer to d-layer spacing values determined at 25° C.

As used herein,
the term "block" refers to a portion of a block copolymer, comprising many monomeric units, that has at least one feature which is not present in the adjacent portions;
the term "block copolymer" refers to a copolymer composed of constitutionally different blocks in linear sequence;
the term "monomeric unit" refers to the largest constitutional unit contributed by a single monomer molecule to the structure of a polymer;
the phrase "compatible with the layered silicate" means capable of intercalating the layered silicate;
the term "exfoliated silicate platelet" refers to an individual silicate platelet that is less than about 5 nanometers thick and has an aspect ratio of at least about 10, and is not associated as a face-to-face stack with at least one other such silicate platelet, regardless of whether the silicate platelet was made by exfoliating a layered silicate or by some other method; and
the term "immiscible" means spontaneously forming two phases if intimately mixed together, each phase independently being continuous or discontinuous.

DETAILED DESCRIPTION

Compositions of the present invention comprise exfoliated silicate platelets; a thermoplastic polymer; and a block copolymer, typically, in the form of a nanocomposite.

Useful layered silicates that may be used as the layered silicate (e.g., intercalated and/or exfoliated) according to the present invention include, for example, natural phyllosilicates, synthetic phyllosilicates, organically modified phyllosilicates (e.g., organoclays), and combinations thereof.

Examples of natural phyllosilicates include smectite and smectite-type clays such as montmorillonite, nontronite, bentonite, beidellite, hectorite, saponite, sauconite, fluorohectorite, stevensite, volkonskoite, magadiite, kenyaite, halloysite, and hydrotalcite.

Suitable synthetic phyllosilicates include, for example, those prepared by hydrothermal processes as disclosed in U.S. Pat. No. 3,252,757 (Granquist); U.S. Pat. No. 3,666,407 (Orlemann); U.S. Pat. No. 3,671,190 (Neumann); U.S. Pat. No. 3,844,978 (Hickson); U.S. Pat. No. 3,844,979 (Hickson); U.S. Pat. No. 3,852,405 (Granquist); and U.S. Pat. No. 3,855,147 (Granquist). Commercially available synthetic smectite clays are commercially available, for example, from Southern Clay Products, Gonzales, Tex., under the trade designation "LAPONITE" including, for example, "LAPONITE B" (a synthetic layered fluorosilicate), "LAPONITE D" (a synthetic layered magnesium silicate), and "LAPONITE RD" (a synthetic layered silicate).

Organoclays are typically smectite or smectite-type clays produced by interacting the unfunctionalized clay with one or more suitable intercalants. These intercalants are typically organic compounds, which are neutral or ionic. Useful neutral organic intercalants include polar compounds such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic intercalants may intercalate into the layers of the clay through hydrogen bonding without completely replacing the original charge balancing ions. Useful ionic intercalants are typically cationic surfactants such as, for example, onium compounds such as ammonium (primary, secondary, tertiary, and quaternary), phosphonium, or sulfonium derivatives of aliphatic, aromatic or aliphatic amines, phosphines and sulfides. Useful onium ions include, for example, quaternary ammonium ions having at least one long chain aliphatic group (e.g., octadecyl, myristyl, or oleyl) bound to the quaternary nitrogen atom. Further details concerning organoclays and methods for their preparation may be found, for example, in U.S. Pat. No. 4,469,639 (Thompson et al.); U.S. Pat. No. 6,036,765 (Farrow et al.); and U.S. Pat. No. 6,521,678B1 (Chaiko).

A variety of organoclays are available from commercial sources. For example, Southern Clay Products offers various organoclays under the trade designations "CLOISITE" (derived from layered magnesium aluminum silicate) and "CLAYTONE" (derived from natural sodium bentonite) including "CLAYTONE HY", "CLAYTONE AF", "CLOISITE 6A" (modifier concentration of 140 meq/100 g), "CLOISITE 15A" (modifier concentration of 125 meq/100 g), and "CLOISITE 20A" (modifier concentration of 95 meq/100 g). Organoclays are also available commercially from Nanocor, Arlington Heights, Ill., under the trade designation "NANOMER".

Typically, layered silicates exhibit a d-layer spacing that can be determined by well-known techniques such as X-ray diffraction (XRD) and/or transmission electron microscopy (TEM). During the method of the present invention the d-layer spacing typically increases as intercalation between individual silicate layers by the block copolymer proceeds until the layers become so widely separated that they are considered exfoliated and no d-layer spacing is observable by XRD or TEM.

Useful thermoplastic polymers include, for example, polylactones such as, for example, poly(pivalolactone) and poly (caprolactone); polyurethanes such as, for example, those derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, or 4,4'-diisocyanatodiphenylmethane with linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl) carbonate), poly(1,1-ether bis(4-phenyl)carbonate), poly(diphenylmethane bis(4-phenyl)carbonate), poly(1,1-cyclohexane bis(4-phenyl)carbonate), or poly(2,2-(bis4-hydroxyphenyl)propane)carbonate; polysulfones; polyether ether ketones; polyamides such as, for example, poly(4-aminobutyric acid), poly(hexamethylene adipamide), poly(6-aminohexanoic acid), poly(m-xylylene adipamide), poly(p-xylylene sebacamide), poly(m-phenylene isophthalamide), and poly(p-phenylene terephthalamide); polyesters such as, for example, poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxy benzoate), poly(1,4-cyclohexylidene dimethylene terephthalate)(cis), poly(1,4-cyclohexylidene dimethylene terephthalate)(trans), polyethylene terephthalate, and polybutylene terephthalate; poly(arylene oxides) such as, for example, poly(2,6-dimethyl-1,4-phenylene oxide) and poly(2,6-diphenyl-1,1-phenylene oxide); poly(arylene sulfides) such as, for example, polyphenylene sulfide; polyetherimides; vinyl polymers and their copolymers such as, for example, polyvinyl acetate, polyvinyl alcohol, polyvinyl chloride, polyvinyl butyral, polyvinylidene chloride, and ethylene-vinyl acetate copolymers; acrylic polymers such as, for example, poly(ethyl acrylate), poly(n-butyl acrylate), poly(methyl methacrylate), poly (ethyl methacrylate), poly(n-butyl methacrylate), poly(n-propyl methacrylate), polyacrylamide, polyacrylonitrile, polyacrylic acid, ethylene-ethyl acrylate copolymers, ethylene-acrylic acid copolymers; acrylonitrile copolymers (e.g., poly(acrylonitrile-co-butadiene-co-styrene) and poly(styrene-co-acrylonitrile)); styrenic polymers such as, for example, polystyrene, poly(styrene-co-maleic anhydride) polymers and their derivatives, methyl methacrylate-styrene copolymers, and methacrylated butadiene-styrene copolymers; polyolefins such as, for example, polyethylene, polybutylene, polypropylene, chlorinated low density polyethylene, poly(4-methyl-1-pentene); ionomers; poly (epichlorohydrins); polysulfones such as, for example, the reaction product of the sodium salt of 2,2-bis(4-hydroxyphenyl)propane and 4,4'-dichlorodiphenyl sulfone; furan resins such as, for example, poly(furan); cellulose ester plastics such as, for example, cellulose acetate, cellulose acetate butyrate, and cellulose propionate; protein plastics; polyarylene ethers such as, for example, polyphenylene oxide; polyimides; polyvinylidene halides; polycarbonates; aromatic polyketones; polyacetals; polysulfonates; polyester ionomers; and polyolefin ionomers. Copolymers and/or combinations of these aforementioned polymers can also be used.

Useful elastomeric polymeric resins (i.e., elastomers) include thermoplastic and thermoset elastomeric polymeric resins, for example, polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, ethylene-acrylate copolymers.

Useful thermoplastic elastomeric polymer resins include block copolymers, made up of blocks of glassy or crystalline blocks such as, for example, polystyrene, poly(vinyltoluene), poly(t-butylstyrene), and polyester, and the elastomeric blocks such as polybutadiene, polyisoprene, ethylene-propylene copolymers, ethylene-butylene copolymers, polyether ester and the like as, for example, poly(styrene-butadiene-styrene) block copolymers marketed by Shell Chemical Company, Houston, Tex., under the trade designation "KRATON". Copolymers and/or mixtures of these aforementioned elastomeric polymeric resins can also be used Useful polymeric resins also include fluoropolymers, that is, at least partially fluorinated polymers. Useful fluoropolymers include, for example, those that are preparable (e.g., by free-radical polymerization) from monomers comprising chlorotrifluoroethylene, 2-chloropentafluoropene, 3-chloropentafluoropropene, vinylidene fluoride, trifluoroethylene, tetrafluoroethylene, 1-hydropentafluoropropene, 2-hydropentafluoropropene, 1,1-dichlorofluoroethylene, dichlorodifluoroethylene, hexafluoropropylene, vinyl fluoride, a perfluorinated vinyl ether (e.g., a perfluoro(alkoxy vinyl ether) such as $CF_3OCF_2CF_2CF_2OCF=CF_2$, or a perfluoro(alkyl vinyl ether) such as perfluoro(methyl vinyl ether) or perfluoro(propyl vinyl ether)), cure site monomers such as for example, nitrile containing monomers (e.g., $CF_2=CFO$ $(CF_2)_LCN$, $CF_2=CFO[CF_2CF(CF_3)O]_q(CF_2O)_yCF(CF_3)$ CN, $CF_2=CF[OCF_2CF(CF_3)]_rO(CF_2)_tCN$, or $CF_2=CFO$ $(CF_2)_uOCF(CF_3)CN$ where L=2-12; q=0-4; r=1-2; y=0-6;

t=1-4; and u=2-6), bromine containing monomers (e.g., Z-$R_f$—$O_x$—CF=$CF_2$, wherein Z is Br or I, $R_f$ is a substituted or unsubstituted $C_1$-$C_{12}$ fluoroalkylene, which may be perfluorinated and may contain one or more ether oxygen atoms, and x is 0 or 1); or a combination thereof, optionally in combination with additional non-fluorinated monomers such as, for example, ethylene or propylene. Specific examples of such fluoropolymers include polyvinylidene fluoride; copolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers (e.g., tetrafluoroethylene-perfluoro(propyl vinyl ether)); and combinations thereof.

Useful commercially available thermoplastic fluoropolymers include, for example, those marketed by Dyneon, LLC, Oakdale, Minn., under the trade designations "THV" (e.g., "THV 220", "THV 400G", "THV 500G", "THV 815", and "THV 610X"), "PVDF", "PFA", "HTE", "ETFE", and "FEP"; those marketed by Atofina Chemicals, Philadelphia, Pa., under the trade designation "KYNAR" (e.g., "KYNAR 740"); those marketed by Solvay Solexis, Thorofare, N.J., under the trade designations "HYLAR" (e.g., "HYLAR 700") and "HALAR ECTFE".

Block copolymers are generally formed by sequentially polymerizing different monomers. Useful methods for forming block copolymers include, for example, anionic, coordination, cationic, and free radical polymerization methods.

Block copolymers useful in practice of the present invention comprise at least two chemically distinct blocks, each block comprising at least 5 monomeric units. The block copolymer is selected such that it comprises a block that is compatible with the layered silicate and at least one additional block that is not compatible with the layered silicate, that is, the block does not intercalate the layered silicate. Further, no additional block contains a segment of 5 consecutive monomeric units that is identical to a segment contained in the thermoplastic polymer, each additional block is immiscible with the thermoplastic polymer, and no additional block forms hydrogen bonds or chemical bonds with the thermoplastic polymer.

Useful block copolymers may have any number of blocks greater than or equal to two (e.g., di-, tri-, tetra-block copolymers), and may have any form such as, for example, linear, star, comb, or ladder. Generally, at least one block should have an affinity for the chosen layered silicate (including organoclay). This block may be hydrophilic or hydrophobic (e.g., when using organoclays) in nature.

Hydrophilic blocks typically have one or more polar moieties such as, for example, acids (e.g., —$CO_2H$, —$SO_3H$, —$PO_3H$); —OH; —SH; primary, secondary, or tertiary amines; ammonium N-substituted or unsubstituted amides and lactams; N-substituted or unsubstituted thioamides and thiolactams; anhydrides; linear or cyclic ethers and polyethers; isocyanates; cyanates; nitriles; carbamates; ureas; thioureas; heterocyclic amines (e.g., pyridine or imidazole)). Useful monomers that may be used to introduce such groups include, for example, acids (e.g., acrylic acid, methacrylic acid, itaconic acid, maleic acid, fumaric acid, and including methacrylic acid functionality formed via the acid catalyzed deprotection of t-butyl methacrylate monomeric units as described in U.S. Pat. Publ. No. "2004/0024130" (Nelson et al.)); acrylates and methacrylates (e.g., 2-hydroxyethyl acrylate), acrylamide and methacrylamide, N-substituted and N,N-disubstituted acrylamides (e.g., N-t-butylacrylamide, N,N-(dimethylamino)ethylacrylamide, N,N-dimethylacrylamide, N,N-dimethylmethacrylamide), N-ethylacrylamide, N-hydroxyethylacrylamide, N-octylacrylamide, N-t-butylacrylamide, N,N-dimethylacrylamide, N,N-diethylacrylamide, and N-ethyl-N-dihydroxyethylacrylamide), aliphatic amines (e.g., 3-dimethylaminopropyl amine, N,N-dimethylethylenediamine); and heterocyclic monomers (e.g., 2-vinylpyridine, 4-vinylpyridine, 2-(2-aminoethyl)pyridine, 1-(2-aminoethyl)pyrrolidine, 3-aminoquinuclidine, N-vinylpyrrolidone, and N-vinylcaprolactam).

Hydrophobic blocks typically have one or more hydrophobic moieties such as, for example, aliphatic and aromatic hydrocarbon moieties such as those having at least about 4, 8, 12, or even 18 carbon atoms; fluorinated aliphatic and/or fluorinated aromatic hydrocarbon moieties, such as for example, those having at least about 4, 8, 12, or even 18 carbon atoms; and silicone moieties.

Useful monomers for introducing such blocks include, for example, hydrocarbon olefins such as, for example, ethylene, propylene, isoprene, styrene, and butadiene; cyclic siloxanes such as for example, decamethylcyclopentasiloxane and decamethyltetrasiloxane; fluorinated olefins such as for example, tetrafluoroethylene, hexafluoropropylene, trifluoroethylene, difluoroethylene, and chlorofluoroethylene; non-fluorinated alkyl acrylates and methacrylates such as for example, butyl acrylate, isooctyl methacrylate lauryl acrylate, stearyl acrylate; fluorinated acrylates such as, for example, perfluoroalkylsulfonamidoalkyl acrylates and methacrylates having the formula $H_2C$=$C(R_2)C(O)O$—X—$N(R)SO_2R_f$ wherein: $R_f$ is —$C_6F_{13}$, —$C_4F_9$, or —$C_3F_7$; R is hydrogen, $C_1$ to $C_{10}$ alkyl, or $C_6$-$C_{10}$ aryl; and X is a divalent connecting group.

Examples include $C_4F_9SO_2N(CH_3)C_2H_4OC(O)NH(C_6H_4)CH_2C_6H_4NHC(O)OC_2H_4OC(O)CH$=$CH_2$ and

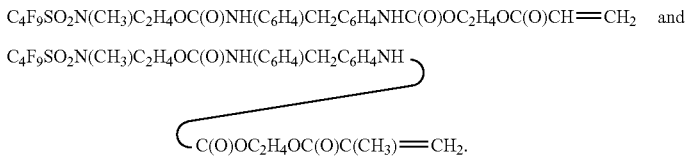

Such monomers may be readily obtained from commercial sources or prepared, for example, according to the procedures in U.S. Pat. Appl. Publ. No. 2004/0023016 (Cernohous et al.), the disclosure of which is incorporated herein by reference.

Examples of useful block copolymers having hydrophobic and hydrophilic blocks include poly(isoprene-block-4-vinylpyridine); poly(isoprene-block-methacrylic acid); poly(isoprene-block-N,N-(dimethylamino)ethyl acrylate); poly(isoprene-block-2-diethylaminostyrene); poly(isoprene-block-glycidyl methacrylate); poly(isoprene-block-2-hydroxyethyl methacrylate); poly(isoprene-block-N-vinylpyrrolidone); poly(isoprene-block-methacrylic anhydride); poly(isoprene-block-(methacrylic anhydride-co-methacrylic acid)); poly(styrene-block-4-vinylpyridine); poly(styrene-block-2-vinylpyridine); poly(styrene-block-acrylic acid); poly(styrene-block-methacrylamide); poly(styrene-block-N-(3-aminopropyl)methacrylamide); poly(styrene-block-N,N-(dimethylamino)ethyl acrylate); poly(styrene-block-2-diethylaminostyrene); poly(styrene-block-glycidyl methacrylate); poly(styrene-block-2-hydroxyethyl methacrylate); poly(styrene-block-N-vinylpyrrolidone copolymer); poly(styrene-block-isoprene-block-4-vinylpyridine); poly(styrene-block-isoprene-block-glycidyl methacrylate); poly(styrene-block-isoprene-block-methacrylic acid); poly(styrene-block-isoprene-block-(methacrylic anhydride-co-methacrylic acid)); poly(styrene-block-isoprene-block-methacrylic anhydride); poly(butadiene-block-4-vinylpyridine); poly(butadiene-block-methacrylic acid); poly(butadiene-block-N,N-(dimethylamino)ethyl acrylate); poly(butadiene-block-2-diethylaminostyrene); poly(butadiene-block-glycidyl methacrylate); poly(butadiene-block-2-hydroxyethyl methacrylate); poly(butadiene-block-N-vinylpyrrolidone); poly(butadiene-block-methacrylic anhydride); poly(butadiene-block-(methacrylic anhydride-co-methacrylic acid); poly(styrene-block-butadiene-block-4-vinylpyridine); poly(styrene-block-butadiene-block-methacrylic acid); poly(styrene-block-butadiene-block-N,N-(dimethylamino)ethyl acrylate); poly(styrene-block-butadiene-block-2-diethylaminostyrene); poly(styrene-block-butadiene-block-glycidyl methacrylate); poly(styrene-block-butadiene-block-2-hydroxyethyl methacrylate); poly(styrene-block-butadiene-block-N-vinylpyrrolidone); poly(styrene-block-butadiene-block-methacrylic anhydride); poly(styrene-block-butadiene-block-(methacrylic anhydride-co-methacrylic acid)); and hydrogenated forms of poly(butadiene-block-4-vinylpyridine), poly(butadiene-block-methacrylic acid), poly(butadiene-block-N,N-(dimethylamino)ethyl acrylate), poly(butadiene-block-2-diethylaminostyrene), poly(butadiene-block-glycidyl methacrylate), poly(butadiene-block-2-hydroxyethyl methacrylate), poly(butadiene-block-N-vinylpyrrolidone), poly(butadiene-block-methacrylic anhydride), poly(butadiene-block-(methacrylic anhydride-co-methacrylic acid)), poly(isoprene-block-4-vinylpyridine), poly(isoprene-block-methacrylic acid), poly(isoprene-block-N,N-(dimethylamino)ethyl acrylate), poly(isoprene-block-2-diethylaminostyrene), poly(isoprene-block-glycidyl methacrylate), poly(isoprene-block-2-hydroxyethyl methacrylate), poly(isoprene-block-N-vinylpyrrolidone), poly(isoprene-block-methacrylic anhydride), poly(isoprene-block-(methacrylic anhydride-co-methacrylic acid)), poly(styrene-block-isoprene-block-glycidyl methacrylate), poly(styrene-block-isoprene-block-methacrylic acid), poly(styrene-block-isoprene-block-methacrylic anhydride-co-methacrylic acid), styrene-block-isoprene-block-methacrylic anhydride, poly(styrene-block-butadiene-block-4-vinylpyridine), poly(styrene-block-butadiene-block-methacrylic acid), poly(styrene-block-butadiene-block-N,N-(dimethylamino)ethyl acrylate), poly(styrene-block-butadiene-block-2-diethylaminostyrene), poly(styrene-block-butadiene-block-glycidyl methacrylate), poly(styrene-block-butadiene-block-2-hydroxyethyl methacrylate), poly(styrene-block-butadiene-block-N-vinylpyrrolidone), poly(styrene-block-butadiene-block-methacrylic anhydride), poly(styrene-block-butadiene-block-(methacrylic anhydride-co-methacrylic acid), poly(MeFBSEMA-block-methacrylic acid) (wherein "MeFBSEMA" refers to 2-(N-methylperfluorobutanesulfonamido)ethyl methacrylate, e.g., as available from 3M Company, Saint Paul, Minn.), poly(MeFBSEMA-block-t-butyl methacrylate), poly(styrene-block-t-butyl methacrylate-block-MeFBSEMA), poly(styrene-block-methacrylic anhydride-block-MeFBSEMA), poly(styrene-block-methacrylic acid-block-MeFBSEMA), poly(styrene-block-(methacrylic anhydride-co-methacrylic acid)-block-MeFBSEMA)), poly(styrene-block-(methacrylic anhydride-co-methacrylic acid-co-MeFBSEMA)), poly(styrene-block-(t-butyl methacrylate-co-MeFBSEMA)), poly(styrene-block-isoprene-block-t-butyl methacrylate-block-MeFBSEMA), poly(styrene-isoprene-block-methacrylic anhydride-block-MeFBSEMA), poly(styrene-isoprene-block-methacrylic acid-block-MeFBSEMA), poly(styrene-block-isoprene-block-(methacrylic anhydride-co-methacrylic acid)-block-MeFBSEMA), poly(styrene-block-isoprene-block-(methacrylic anhydride-co-methacrylic acid-co-MeFBSEMA)), poly(styrene-block-isoprene-block-(t-butyl methacrylate-co-MeFBSEMA)), poly(MeFBSEMA-block-methacrylic anhydride), poly(MeFBSEMA-block-(methacrylic acid-co-methacrylic anhydride)), poly(styrene-block-(t-butyl methacrylate-co-MeFBSEMA)), poly(styrene-block-butadiene-block-t-butyl methacrylate-block-MeFBSEMA), poly(styrene-butadiene-block-methacrylic anhydride-block-MeFBSEMA), poly(styrene-butadiene-block-methacrylic acid-block-MeFBSEMA), poly(styrene-block-butadiene-block-(methacrylic anhydride-co-methacrylic acid)-block-MeFBSEMA), poly(styrene-block-butadiene-block-(methacrylic anhydride-co-methacrylic acid-co-MeFBSEMA)), and poly(styrene-block-butadiene-block-(t-butyl methacrylate-co-MeFBSEMA)).

Generally, the block copolymer should be chosen such that at least one block is capable of intercalating the layered silicate. For natural and synthetic clays, this typically means that at least one block should be hydrophilic; while in the case of organoclays the block may be hydrophilic or hydrophobic. The choice of remaining blocks of the block copolymer will typically be directed by the nature of any polymeric resin with which the layered silicate and block copolymer will be subsequently combined. While the additional blocks must be immiscible with the thermoplastic polymer, at least one (e.g., all) of the additional blocks is typically selected to be more compatible with the thermoplastic polymer than the clay itself. For example, oleophilic blocks such as polyolefins, poly(alkyl acrylates), styrenics, polysiloxanes, and fluoropolymers are typically useful with oleophilic thermoplastic polymers such as polyolefins, styrenics, and fluoropolymers.

Any amount of block copolymer may be used, however, typically the block copolymer is included in an amount in a range of 0.01 to 10 parts or more by weight for every part of the layered silicate included in the first mixture. More typically, the block copolymer is included in an amount in a range of 0.05 to 2 parts or more by weight for every part of the layered silicate included in the first mixture.

A solvent may, optionally, be combined with the block copolymer and layered silicate, for example, to aid in intercalation and/or exfoliation of the layered silicate. Useful solvents include, for example, organic solvents, water, supercritical $CO_2$, and combinations thereof. Examples of organic solvents include esters (e.g., ethyl acetate, butyl acetate, beta-ethoxyethyl acetate, beta-butoxy-beta-ethoxyethyl acetate, methylcellosolve acetate, cellosolve acetate, diethylene glycol monoacetate, methoxytriglycolacetate, and sorbitol acetate), ketones (e.g., methyl isobutyl ketone, 2-butanone, acetonylacetone, and acetone), aromatic hydrocarbons (e.g., benzene, toluene, and xylene), aliphatic hydrocarbons (e.g., cyclohexane, heptane, octane, decane, and dodecane), nitriles (e.g., acetonitrile), ethers (e.g., tetrahydrofuran, dioxane, and diglyme), alcohols (e.g., methanol, ethanol, isopropanol, butanol, octanol, decanol, butylcarbitol, methylcarbitol, diethylene glycol, dipropylene glycol, ethylene glycol, propylene glycol, ethylene glycol monomethyl ether, ethylene glycol monobutyl ether, and diacetone alcohol), halocarbons (e.g., carbon tetrachloride, methylene chloride, trifluorotoluene, and chloroform), and combinations thereof.

However, if a solvent is used its content in the mixture comprising block copolymer and intercalated layered silicate and/or exfoliated silicate platelets is typically reduced to a low level, although this is not a requirement. For example, mixtures and/or nanocomposites according to the present invention may be essentially free of (i.e., contain less than about one percent of) solvent. Methods for removing solvent include, for example, oven drying and evaporation under reduced pressure.

Optionally, the composition may further contain one or more additives such as, for example, surfactants, flame proofing agents, fillers, ultraviolet absorbers, antioxidants, tackifier resins, colorants, fragrances, or antimicrobial agents.

While compositions according to the present invention are typically prepared and processed in a fluid state (e.g., as a melt or in optional solvent), they may also be utilized as solids; for example after cooling and/or after removing any optional solvent.

Compositions according to present invention may be made according to any suitable method.

In one exemplary method, the layered silicate, thermoplastic polymer, block copolymer, and a solvent capable of swelling the layered silicate and dissolving the thermoplastic polymer and the block copolymer are mixed, and then the solvent is evaporated (e.g., in an oven or on a rotary evaporator).

In another exemplary method, the components of the present composition are masticated in a kneader or extruder. Such equipment is well known and/or readily commercially available; typically equipped with devolatilizing capabilities (e.g., vacuum ports) and/or temperature-controlled zones. The equipment may have a single port (other than any vacuum ports) for introducing and extracting material, or it may have separate inlet and outlet ports as in the case of an extruder or high viscosity processor.

If the components of the composition comprise a solvent, then the solvent is typically removed under partial vacuum during mastication. For example, as described in concurrently filed U.S. Pat. Appl. entitled "METHOD OF MAKING A COMPOSITION AND NANOCOMPOSITES THEREFROM" (Nelson et al.), and bearing Attorney Case No. 60060US002, the disclosure of which is incorporated herein by reference.

One example of a suitable high viscosity processor (i.e., a kneader), typically supplied with vacuum equipment, is a high viscosity processor marketed under the trade designation "DISCOTHERM B" by List USA, Inc., Acton, Mass.

Another example of a suitable kneader, fitted with a vacuum system, is that marketed by IKA Works, Inc., Wilmington, N.C., under the trade designation "MKD 0,6-H 60 HIGH-PERFORMANCE MEASURING KNEADER".

Yet another example of a suitable high performance kneader is commercially available under the trade designation "SRUGO SIGMA KNEADER" from Srugo Machines Engineering, Netivot, Israel. This kneader can be connected to vacuum equipment by vacuum ports on the kneader.

Useful extruders include, for example, single- and multiple-screw extruders and reciprocating extruders. Examples of suitable extruders include those marketed by Coperion Buss AG, Pratteln, Switzerland, under the trade designation "MKS", for example, "MKS 30".

The extent of intercalation and/or exfoliation of the layered silicate can be controlled in large part through variables including, for example, concentration or composition of components, pressure (i.e., vacuum) in the mixing apparatus, the temperature profile of the process (e.g., isothermal or ramped), screw design, order of addition of materials, the level of applied shear force and/or rate, and the duration of the mixing process. For example, intercalation and/or exfoliation may typically be enhanced by increasing the temperature or reducing the rate of solvent removal (e.g., by lessening the degree of an applied vacuum). In selecting the temperature the physical properties and chemical properties of the solvent, layered silicate, and block copolymer should be considered, for example, such that decomposition of the layered silicate and/or block copolymer may be kept at a relatively low level. Such variables may be modified in a continuous or stepwise manner, or they may be maintained at a constant level. To aid in processing, the temperature of kneader or extruder is typically kept above the glass transition temperature and/or melting temperature of the block copolymer, although this is not a requirement.

Whatever the method utilized, the method should be of sufficient duration to ensure that at least 20, 30, 40, 50, 60, 70, 80 or even at least 90 percent by weight of the layered silicate is exfoliated to form a plurality of exfoliated silicate platelets dispersed in the thermoplastic polymer.

Methods according to the present invention may be carried out in batch process or in a continuous manner.

Compositions prepared according to the present invention are dispersions; typically, isotropic dispersions of exfoliated silicate platelets in the thermoplastic polymer. The block copolymer typically associates with the exfoliated silicate platelets and serves as a dispersing aid so that the exfoliated silicate platelets can be dispersed in the thermoplastic resin. The amount of exfoliated silicate platelets in the composition may be in any amount, but are typically in a range of from 0.1 to 10 percent by weight, more typically in a range of from 0.5 to 7 percent by weight, and even more typically in a range of from 1 to 5 percent by weight, based on the total weight of the composition.

Similarly, in some embodiments, the weight ratio of the exfoliated silicate platelets to the layered silicate in the composition may be at least 0.2, 0.5, 1, 2, 3, 4, 5, 10, 50 or more, although lesser weight ratios may also be used. For example, in methods according to the present invention, the layered silicate may be at least 40, 50, 60, 70, or even at least 95 percent exfoliated, based in the initial weight of layered silicate utilized. In some cases, substantially all of the layered silicate may become exfoliated.

Nanocomposites prepared according to the present invention are useful, for example, in the manufacture of barrier films or bottles, and flame retardant materials.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used throughout the Examples:

Abbreviation Description

P(S-VP) AB diblock copolymer, poly(styrene-block-4-vinylpyridine), synthesized using a stirred tubular reactor process generally as described in Example 1 of U.S. Pat. No. 6,448,353 (Nelson et al.), the disclosure of which is incorporated herein by reference; $M_n$=20 kg/mole; PDI=1.8; 95/5 weight ratio of styrene to 4-vinylpyridine monomeric units.

P(I-GMA) AB diblock copolymer, poly[isoprene-block-glycidyl methacrylate]; synthesized using a stirred tubular reactor, generally as described in Example 4 of U.S. Pat. No. 6,448,353 (Nelson et al.), except that glycidyl methacrylate was used in place of 4-vinylpyridine; $M_n$=30 kg/mole; PDI=4.00; 94/6 weight ratio of isoprene to glycidyl methacrylate monomeric units.

P(I-S-VP) ABC triblock copolymer, poly[isoprene-block-styrene-block-4-vinylpyridine]; synthesized using a stirred tubular reactor, generally as described in Example 4 of U.S. Pat. No. 6,448,353 (Nelson et al.), except that styrene was added to the mixture; $M_n$=35 kg/mole; PDI=2.0; 20/75/5 weight ratio of PI/PS/PVP isoprene to styrene to 4-vinylpyridine monomeric units.

P(I-VP) AB diblock copolymer, poly(isoprene-block-4-vinylpyridine), synthesized using a stirred tubular reactor, generally as described in Example 8d of U.S. Pat. No. 6,448,353 (Nelson et al.); $M_n$=30 kg/mole; PDI=2.1; 96/4 weight ratio of isoprene to 4-vinylpyridine monomeric units.

P(S-GMA) AB diblock copolymer, poly[styrene-block-glycidyl methacrylate]. Synthesized using a stirred tubular reactor process, generally as described in Example 4 of U.S. Pat. No. 6,448,353 (Nelson et al.); $M_n$=40 kg/mole; PDI=2.2; 98/2 weight ratio of styrene to glycidyl methacrylate monomeric units.

P(t-BMA-AB diblock copolymer, poly[t-butyl methacrylate-block-2-(N-

MeFBSEMA) methylperfluorobutanesulfonamido)ethyl methacrylate]; synthesized using a stirred tubular reactor process, generally as described in Example 4 of U.S. Pat. Appl. Publ. 2004/0023016 (Cernohous et. al.); $M_n$=65 kg/mole; PDI=1.7; 80/20 weight ratio of t-butyl methacrylate to 2-(N-methylperfluorobutanesulfonamido)ethyl methacrylate monomeric units.

OC1 Organically modified montmorillonite clay available under the trade designation "CLOISITE 20A" from Southern Clay Products (modified with methyl, tallow (~65% $C_{18}$; ~30% $C_{16}$; ~5% $C_{14}$), quaternary ammonium chloride; XRD analysis of OC1 as purchased showed a d-layer spacing of 2.41 nanometers (nm).

OC2 Organically modified montmorillonite clay available under the trade designation "CLOISITE 10A" from Southern Clay Products, Gonzales, Tex. (modified with dimethyl, benzyl, hydrogenated tallow (~65% $C_{18}$; ~30% $C_{16}$; ~5% $C_{14}$), quaternary ammonium chloride; believed to have a d-layer spacing of 1.92 nm.

OC3 Organically modified montmorillonite clay available under the trade designation "CLOISITE 25A" from Southern Clay Products (modified with dimethyl, hydrogenated tallow (~65% $C_{18}$; ~30% $C_{16}$; ~5% $C_{14}$), 2-ethylhexyl quaternary ammonium methyl sulfate; believed to have a d-layer spacing of 1.86 nm.

OC4 Organically modified montmorillonite clay available under the trade designation "CLOISITE 30B" from Southern Clay Products (modified with methyl, tallow (~65% $C_{18}$; ~30% $C_{16}$; ~5% $C_{14}$), bis-2-hydroxyethyl, quaternary ammonium chloride); believed to have a d-layer spacing of 1.85 nm.

FE A 65.9 percent by weight fluorine copolymer of vinylidene fluoride and hexafluoropropylene; available under the trade designation "FC 2145" from Dyneon, LLC.

PP Polypropylene available under the trade designation "ESCORENE 1024" from Exxon Mobil Corp., Irving, Tex.

HDPE High density polyethylene, available under the trade designation "ALATHON M6020" from Equistar Chemical Co., Houston, Tex.

TPO Thermoplastic polyolefin, available under the trade designation "FLEXATHENE TP1300HC" from Equistar Chemical Co., Houston, Tex.

The following procedures were used in the Examples:

Film Preparation for XRD and TEM Analysis

Analysis via XRD and TEM was done on 1 mm thick films. To form the films, each material to be analyzed was placed between 0.051 mm thick untreated polyester liners, which in turn were placed between 2 aluminum plates (3.2 mm thick each) to form a stack. Two shims (1 mm thick each) were placed to either side of the stack such that upon pressing the assembled stack the mixture would not come into contact with either shim. Each stack was placed in a heated hydraulic press available under the trade designation "WABASH MPI MODEL G30H-15-LP" from Wabash MPI, Wabash, Ind. Both the top and bottom press plates were heated at 193° C. The stack was pressed for 1 minute at 1500 psi (10 MPa). The hot stack was then moved to a low-pressure water-cooled press for 30 seconds to cool the stack. The stack was disassembled and the liners were removed from both sides of the film disc that resulted from pressing the mixture.

X-Ray Diffraction (XRD)

Reflection geometry X-ray scattering data were collected using a four-circle diffractometer (available under the trade designation "HUBER (424/511.1)" from Huber Diffraktionstechnik GmbH, D83253 Rimsting, Germany), copper K-alpha radiation, and scintillation detector registry of the scattered radiation. The incident beam was collimated to a circular aperture of 0.70 mm. Scans were conducted in a reflection geometry from 0.5 to 10 degrees (2 theta) using a 0.05 degree step size and 10 second dwell time. A sealed tube X-ray source and X-ray generator settings of 40 kV and 20 mA were used. Data analysis and peak position definition were determined using X-ray diffraction analysis software available under the trade designation "JADE" from MDI, Inc., Livermore, Calif.

Transmission Electron Microscopy (TEM)

TEM was performed using a transmission electron microscope operated at 200 kV, available under the trade designation "JEOL 200CX" from JEOL USA, Peabody, Mass.

Molecular Weight and Polydispersity

Average molecular weight and polydispersity were determined by Gel Permeation Chromatography (GPC) analysis. Approximately 25 mg of a sample were dissolved in 10 milliliters (mL) of THF to form a mixture. The mixture was filtered using a 0.2-micron pore size polytetrafluoroethylene syringe filter. Then, about 150 microliters of the filtered solution were injected into a gel-packed column 25 cm long by 1 cm diameter available under the trade designation "PLGEL-MIXED B" from PolymerLabs, Amherst, Mass., that was part of a GPC system equipped with an autosampler and a pump. The GPC was system operated at room temperature using THF eluent that moved at a flow rate of approximately 0.95 mL/minute. A refractive index detector was used to detect changes in concentration. Number average molecular weight ($M_n$) and polydispersity index (PDI) calculations were calibrated using narrow polydispersity polystyrene controls ranging in molecular weight from 600 to 6×10⁶ g/mole. The actual calculations were made with software (available under the trade designation "CALIBER" from Polymer Labs).

¹H NMR Spectroscopy

The relative concentration of each block was determined by ¹H Nuclear Magnetic Resonance (¹H NMR) spectroscopy analysis. Specimens were dissolved in deuterated chloroform at a concentration of about 10 percent by weight and placed in a 500 MHz NMR Spectrometer available under the trade designation "UNITY 500 MHZ NMR SPECTROMETER" from Varian, Inc., Palo Alto, Calif. Block concentrations were calculated from relative areas of characteristic block component spectra.

Yield Stress and Tensile Modulus Measurement

Pelletized nanocomposite portions were injected at 180° C. and 70 psi (0.48 MPa) using an injection molder available under the trade designation "MINI-JECTOR MODEL 45" from Mini-Jector Machinery Corp., Newbury, Ohio. Tensile bars were produced for physical property testing and made according to ASTM D1708-2a "Standard Test Method for Tensile Properties of Plastics By Use of Microtensile Specimens (2002)". The samples were tested on a tensile tester available under the trade designation "INSTRON 5500 R" from Instron Corporation, Canton, Mass. The portions were pulled at a rate of 50.8 mm/min in a temperature and humidity controlled room at 21.1° C. and 55 percent relative humidity. Reported results represent an average of 5 individual measurements.

The following general procedures are used in the examples:

General Batch Procedure for Mixing

Components were mixed in a melt mixer available under the trade designation "BRABENDER PLASTI-CORDER MODEL PL2100" (BPM) from Brabender, South Hackensack, N.J. The mixer was equipped with a type 6 mixer head utilizing roller blade mixing paddles. Batch temperature and torque were measured during the mixing. The thermoplastic polymer is added to the mixer and allowed to melt at a temperature of 180° C. and a paddle speed of 50 rpm. Once the temperature is equilibrated, the block copolymer and layered silicate are added simultaneously. The composites are mixed for 30 minutes.

General Procedure for Continuous Twin-Screw Extrusion

Extrusion was carried out using a co-rotating, 25 mm twin-screw extruder with 41:1 L/D available under the trade designation "COPERION ZSK-25 WORLD LAB EXTRUDER" from Coperion, Ramsey, N.J. Barrel zones for the extruder model utilized in these examples are 4D (100 mm) in length. Two screw designs may be utilized.

Screw Design A:

In order to create a uniform melt stream prior to the addition of the block copolymer and clay materials in barrel zones 2 and 3 the screw design incorporates a distributive mixing section of 1.76D (i.e., 1.76 times the bore diameter) total length, consisting mainly of gear-type mixing elements, under the trade designation "ZME" available from Coperion. A low- to medium-shear-intensity kneading section is utilized in barrel zone 4 for incorporating and melting the hand-blended block copolymer and clay powder additives into the molten resin after their addition to the extruder in barrel zone 3 through a 2D port open to the atmosphere. Total length for this kneading section is 2.5D. The temperature of the melt stream is monitored and recorded over this kneading section by an immersion-depth thermocouple. A small atmospheric vent, 1D in length, at the beginning of barrel zone 5 allowed the venting of any entrapped air from the powder addition. Spanning barrel zone 5, 6, and 7, a 5.5D kneading section with shear-intensive forward kneading blocks is designed for dispersion and exfoliation of the clay into the host resin. This mixing section is sealed on the downstream end by three, narrow-paddled, reverse kneading blocks to ensure that the mixing section is filled with melt as well as to distribute the exfoliated clay material throughout the composite. The melt temperature of the material in this kneading section is monitored and recorded using an immersion-depth thermocouple. Another 5D mixing section with shear-intensive, forward kneading blocks was used in zones 8 and 9 to provide additional shear for further exfoliation of the clay particles. This section is not sealed with reverse kneading blocks in order to allow a nitrogen sweep gas, which is injected in barrel zone 7, to flow freely across the mostly-filled mixing zone to the vacuum vent, 2D in length, in barrel zone 9 to remove any volatiles. A vacuum of 52 torr (6.9 kPa) is pulled on this vent.

Screw Design B:

This design is similar to screw design A but differs in that the two downstream mixing sections employ intermediate-shear, forwarding kneading blocks instead of the wider-paddled, shear-intensive blocks that design A uses. These mixing zones are also shorter in length than in screw design A due to employing narrower kneading disks than screw design A. Total lengths of these mixing sections are 3D and 3D, respectively, compared with 5.5D and 5D for the corresponding mixing sections in screw design A. Overall, screw B has less shear intensity than screw A.

The continuous extrusion of molten resin into the feed zone of the twin screw extruder is accomplished by using a 1.25-inch (3.18 cm) single-screw extruder equipped with a 3.0:1 compression general-purpose screw with 24 flights, available under the trade designation "KILLION KTS-125" from Davis-Standard, Pawcatuck, Conn. Powder additives were hand-blended and fed into barrel zone 3 of the twin-screw extruder using a gravimetric feeder equipped with twin auger screws available under the trade designation "K-TRON GRAVIMETRIC FEEDER, MODEL KCLKT20" from K-Tron International, Pitman, N.J. The molten composite was metered through a 10.3 mL/revolution gear pump available under the trade designation "NORMAG" from Dynisco Extrusion, Hickory, N.C., and extruded through a ½ inch (1.3 cm) diameter pipe to form strands. This extruded strand was cooled in an 8 foot (2.4 m) water bath available from Berlyn Corporation, Worcester, Mass., and pelletized using a strand pelletizer available under the trade designation "CONAIR MODEL 304" from Reduction Engineering, Kent, Ohio.

Examples 1-12

Block copolymer, layered silicate, and thermoplastic polymer were mixed in amounts as reported in Table 1 (below) and extruded according to the General Procedure for Continuous Twin-Screw Extrusion.

TABLE 1

| Example | Block Copolymer | Layered Silicate | Resin | Weight Ratio of resin/block copolymer/ layered silicate |
|---|---|---|---|---|
| 1 | P(S-VP) | OC2 | PP | 90/5/5 |
| 2 | P(S-VP) | OC3 | PP | 90/5/5 |
| 3 | P(S-VP) | OC4 | PP | 90/5/5 |
| 4 | P(S-GMA) | OC4 | PP | 90/5/5 |
| 5 | P(I-S-VP) | OC4 | PP | 94/1/5 |
| 6 | P(t-BMA-MeFBSEMA) | OC4 | PP | 90/5/5 |
| 7 | P(t-BMA-MeFBSEMA) | OC4 | PP | 92/3/5 |
| 8 | P(t-BMA-MeFBSEMA) | OC4 | PP | 94/1/5 |
| 9 | P(S-VP) | OC4 | HDPE | 90/5/5 |
| 10 | P(I-S-VP) | OC4 | HDPE | 90/5/5 |
| 11 | P(t-BMA-MeFBSEMA) | OC4 | HDPE | 90/5/5 |
| 12 | P(t-BMA-MeFBSEMA) | OC4 | TPO | 90/5/5 |

Extrusion conditions for Examples 1-12 are reported in Table 2 (below), which also reports the form of the layered silicate as determined by XRD.

TABLE 2

| Example | Resin Feed Rate, kg/hr | Block Copolymer Feed Rate, kg/hr | Clay Feed Rate, kg/hr | Screw Design | Screw Speed, rpm | Extruder Barrel Temperature, °C. | Major Form of Layered Silicate |
|---|---|---|---|---|---|---|---|
| 1 | 8.2 | 0.45 | 0.45 | B | 165 | 200 | exfoliated |
| 2 | 8.2 | 0.45 | 0.45 | B | 130 | 220 | exfoliated |
| 3 | 8.2 | 0.45 | 0.45 | A | 130 | 180 | intercalated, increase in d-layer spacing observed |
| 4 | 8.2 | 0.45 | 0.45 | A | 130 | 180 | exfoliated |
| 5 | 8.5 | 0.09 | 0.45 | A | 165 | 200 | exfoliated |
| 6 | 8.2 | 0.45 | 0.45 | A | 165 | 200 | intercalated, increase in d-layer spacing observed |
| 7 | 8.3 | 0.27 | 0.45 | A | 165 | 200 | intercalated, increase in d-layer spacing observed |
| 8 | 8.5 | 0.09 | 0.45 | A | 165 | 200 | intercalated, increase in d-layer spacing observed |
| 9 | 8.2 | 0.45 | 0.45 | A | 165 | 200 | intercalated, increase in d-layer spacing observed |
| 10 | 8.2 | 0.45 | 0.45 | A | 165 | 200 | intercalated, increase in d-layer spacing observed |
| 11 | 8.2 | 0.45 | 0.45 | A | 165 | 200 | exfoliated |
| 12 | 8.2 | 0.45 | 0.45 | A | 250 | 200 | intercalated, increase in d-layer spacing observed |

Examples 13-17

Examples 13-17 were prepared according to the General Procedure for Continuous Twin-Screw Extrusion using PP as the thermoplastic polymer. Example 17 was prepared using PP, but without added block copolymer or layered silicate. Table 3 (below) reports the pelletized extrudate compositions and corresponding physical properties.

TABLE 3

| Example | Block Copolymer | Layered Silicate | Weight Ratio of PP/block copolymer/clay | Screw Design | Screw Speed, rpm | Extruder Barrel Temperature, °C. | Tensile Modulus, MPa | Yield Stress, MPa |
|---|---|---|---|---|---|---|---|---|
| 13 | P(S-VP) | OC2 | 90/5/5 | B | 600 | 180 | 689 | 34.8 |
| 14 | P(S-VP) | OC3 | 90/5/5 | B | 130 | 180 | 665 | 32.9 |
| 15 | P(S-VP) | OC4 | 90/5/5 | A | 165 | 200 | 677 | 37.2 |
| 16 | P(S-GMA) | OC4 | 90/5/5 | A | 200 | 220 | 683 | 33.4 |
| 17 | — | — | — | Not extruded | Not extruded | Not extruded | 468 | 29.8 |

Examples 18-20

Examples 18-20 were carried out according to the General Batch Procedure for Mixing. The resultant melt mixture was removed from the melt mixer, cooled to room temperature, pressed into a film, and analyzed by XRD. Table 4 (below) reports the compositions and form of the layered silicate.

TABLE 4

| Example | P(I-VP), g | P(I-GMA), g | OC4, g | OC3, g | PP, g | Weight Ratio of PP/block copolymer/clay | Major Form of Layered Silicate |
|---|---|---|---|---|---|---|---|
| 18 | 2.5 | — | 2.5 | — | 45 | 90/5/5 | exfoliated |
| 19 | 2.5 | — | — | 2.5 | 45 | 90/5/5 | intercalated, increase in d-layer spacing observed |
| 20 | — | 2.5 | 2.5 | — | 45 | 90/5/5 | exfoliated |

Example 21

P(I-VP) (100 g) was dissolved in 800 g of THF. OC1 (100 g) was added to this solution. The solution was dried in a batch vacuum oven at 80° C. for 12 hours until all the THF had been removed. The resultant masterbatch had a 1:1 weight ratio of P(I-VP):OC1.

A variable speed two-roll mill obtained from Kobelco Stewart Bolling, Hudson, Ohio, was used to compound 30 g of the masterbatch with 300 g of FE. The rollers were 6 inches (15 cm) in diameter and 12 inches (30 cm) long, and the roll speed was 31 revolutions per minute (rpm). The masterbatch was added after the FE was banded on the roll and mixed by cutting the band and pulling the rolling bank through until the resultant mixture was uniform in appearance (approximately 10 minutes). The roll speed was 31 rpm. The resultant mixtures from the mill were pressed into a film, and analyzed by XRD, which showed an increase in the d-layer spacing to 3.5 nm, indicative of intercalation.

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a nanocomposite, the method comprising:
   combining components comprising:
      a layered silicate;
      a thermoplastic polymer; and
      a block copolymer comprising a block that is compatible with the layered silicate and at least one additional block that is not compatible with the layered silicate; and
   exfoliating at least 20 percent by weight of the layered silicate to form a plurality of exfoliated silicate platelets dispersed in the thermoplastic polymer,
wherein no additional block contains a segment of 5 consecutive monomeric units that is identical to a segment contained in the thermoplastic polymer, wherein each additional block is immiscible with the thermoplastic polymer, and wherein no additional block forms hydrogen bonds or chemical bonds with the thermoplastic polymer.

2. A method according to claim 1, wherein the thermoplastic polymer comprises a polyolefin, a fluoropolymer, or polystyrene.

3. A method according to claim 1, wherein the thermoplastic polymer is selected from the group consisting of polyethylene and polypropylene.

4. A method according to claim 1, wherein the layered silicate is at least 40 percent exfoliated.

5. A method according to claim 1, wherein the layered silicate is at least 70 percent exfoliated.

6. A method according to claim 1, wherein at least 95 percent by weight of the layered silicate becomes exfoliated.

7. A method according to claim 1, wherein the components further comprise a solvent.

8. A method according to claim 1, wherein the block copolymer comprises a diblock polymer.

9. A method according to claim 1, wherein the block copolymer is selected from the group consisting of poly(styrene-block-4-vinylpyridine), poly(styrene-block-isoprene-block-4-vinylpyridine), poly(styrene-block-butadiene-block-4-vinylpyridine), poly(isoprene-block-4-vinylpyridine), poly(butadiene-block-4-vinylpyridine), hydrogenated versions of poly(butadiene-block-4-vinylpyridine), poly(styrene-block-isoprene-block-4-vinylpyridine), poly(styrene-block-butadiene-block-4-vinylpyridine), and poly(isoprene-block-4-vinylpyridine).

10. A method according to claim 1, wherein the layered silicate comprises montmorillonite, nontronite, bentonite, beidellite, hectorite, saponite, sauconite, fluorohectorite, stevensite, volkonskoite, magadiite, kenyaite, halloysite, hydrotalcite, a synthetic layered silicate, or a combination thereof.

11. A method according to claim 1, wherein the layered silicate comprises an organoclay.

12. A method according to claim 1, wherein the weight ratio of the block copolymer to the layered silicate included in the first mixture is in a range of 0.01 to 10, inclusive.

13. A method according to claim 1, wherein the weight ratio of the block copolymer to the layered silicate included in the first mixture is in a range of 0.05 to 2, inclusive.

14. A nanocomposite comprising:
   exfoliated silicate platelets;
   a thermoplastic polymer; and
   a block copolymer comprising a block that is compatible with the layered silicate and at least one additional block that is not compatible with the layered silicate, wherein no additional block contains a segment of 5 consecutive monomeric units that is identical to a segment contained in the thermoplastic polymer, wherein each additional block is immiscible with the thermoplastic polymer, wherein no additional block forms hydrogen bonds or chemical bonds with the thermoplastic polymer, and wherein:
   the nanocomposite is free of any layered silicate, or the weight ratio of exfoliated silicate platelets to the layered silicate is at least 0.2.

15. A nanocomposite according to claim 14, wherein the thermoplastic polymer is selected from the group consisting of polyolefins and fluoropolymers.

16. A nanocomposite according to claim 14, wherein the thermoplastic polymer is selected from the group consisting of polyethylene and polypropylene.

17. A nanocomposite according to claim 14, wherein the block copolymer comprises a diblock polymer.

18. A nanocomposite according to claim 14, wherein the block copolymer is selected from the group consisting of poly(styrene-block-4-vinylpyridine), poly(styrene-block-isoprene-block-4-vinylpyridine), poly(styrene-block-butadiene-block-4-vinylpyridine), poly(isoprene-block-4-vinylpyridine), poly(butadiene-block-4-vinylpyridine), hydrogenated versions of poly(butadiene-block-4-vinylpyridine), poly(styrene-block-isoprene-block-4-vinylpyridine), poly(styrene-block-butadiene-block-4-vinylpyridine), and poly(isoprene-block-4-vinylpyridine).

19. A nanocomposite according to claim 14, wherein at least a portion of the silicate platelets comprise a layer of a layered silicate selected from the group consisting of montmorillonite, nontronite, bentonite, beidellite, hectorite, saponite, sauconite, fluorohectorite, stevensite, volkonskoite, magadiite, kenyaite, halloysite, hydrotalcite, and synthetic layered silicates.

20. A nanocomposite according to claim 14, wherein the weight ratio of the block copolymer to the silicate platelets is in a range of 0.01 to 10, inclusive.

21. A nanocomposite according to claim 14, wherein the exfoliated silicate platelets comprise from 1 to 5 percent by weight, inclusive, of the nanocomposite.

22. A nanocomposite according to claim 14, wherein the nanocomposite comprises at least a portion of a film or bottle.

* * * * *